United States Patent
Boelling et al.

(10) Patent No.: US 8,206,227 B2
(45) Date of Patent: Jun. 26, 2012

(54) TORSIONAL VIBRATION DAMPER COMPRISING A SECTIONAL PRIMARY ELEMENT

(75) Inventors: Jochen Boelling, Baden-Baden (DE); Christian Bernhard Halm, Walldorf (DE); Frank Guenter, Karlsruhe (DE); Volker Heinz, Roemerberg (DE)

(73) Assignee: BorgWarner Inc., Auburn Hills, MI (US)

( * ) Notice: Subject to any disclaimer, the term of this patent is extended or adjusted under 35 U.S.C. 154(b) by 289 days.

(21) Appl. No.: 12/519,239

(22) PCT Filed: Dec. 5, 2007

(86) PCT No.: PCT/EP2007/010544
§ 371 (c)(1),
(2), (4) Date: Jun. 15, 2009

(87) PCT Pub. No.: WO2008/074399
PCT Pub. Date: Jun. 26, 2008

(65) Prior Publication Data
US 2010/0025178 A1 Feb. 4, 2010

(30) Foreign Application Priority Data

Dec. 18, 2006 (DE) .......................... 10 2006 060 201
Feb. 23, 2007 (DE) .......................... 10 2007 008 834

(51) Int. Cl.
*F16F 15/121* (2006.01)
(52) U.S. Cl. .......................................... 464/68.8; 464/75
(58) Field of Classification Search ................. 464/68.8, 464/74, 75; 192/213.2–213.22
See application file for complete search history.

(56) References Cited

U.S. PATENT DOCUMENTS

| | | | | |
|---|---|---|---|---|
| 4,194,373 A | | 3/1980 | Jennings et al. | ................. 64/14 |
| 4,470,494 A | * | 9/1984 | Takeuchi | |
| 7,665,590 B2 | * | 2/2010 | Kroll et al. | ............. 192/213.2 X |

FOREIGN PATENT DOCUMENTS

| | | |
|---|---|---|
| DE | 199 58 814 A1 | 6/2001 |
| EP | 0 463 941 | 1/1992 |
| EP | 1 574 744 B1 | 9/2005 |
| EP | 1 584 838 B1 | 10/2005 |
| FR | 2 812 701 | 2/2002 |
| FR | 2 821 404 | 8/2002 |
| FR | 2 849 683 | 7/2004 |
| FR | 2 880 398 | 7/2006 |
| WO | WO 96/10138 | 4/1996 |

* cited by examiner

*Primary Examiner* — Gregory Binda
(74) *Attorney, Agent, or Firm* — Bliss McGlynn, P.C.

(57) ABSTRACT

A torsional vibration damper includes a drive-side primary element having at least one primary dog, an output-side secondary element having at least one secondary dog, and at least one spring device between the primary and secondary dogs for spring-elastic coupling of the primary element to the secondary element and including a plurality of spring elements. A separator sheet includes a ring element. At least one sliding block extends from the ring element between adjacent spring elements and is arranged circumferentially about the spring elements. The primary element has also an inner part having an external toothing, an outer part on which the primary dog is arranged and having an internal toothing engaging into the external toothing, and at least one damping part arranged between the external and internal toothing for vibration damping between the inner and outer parts.

4 Claims, 11 Drawing Sheets

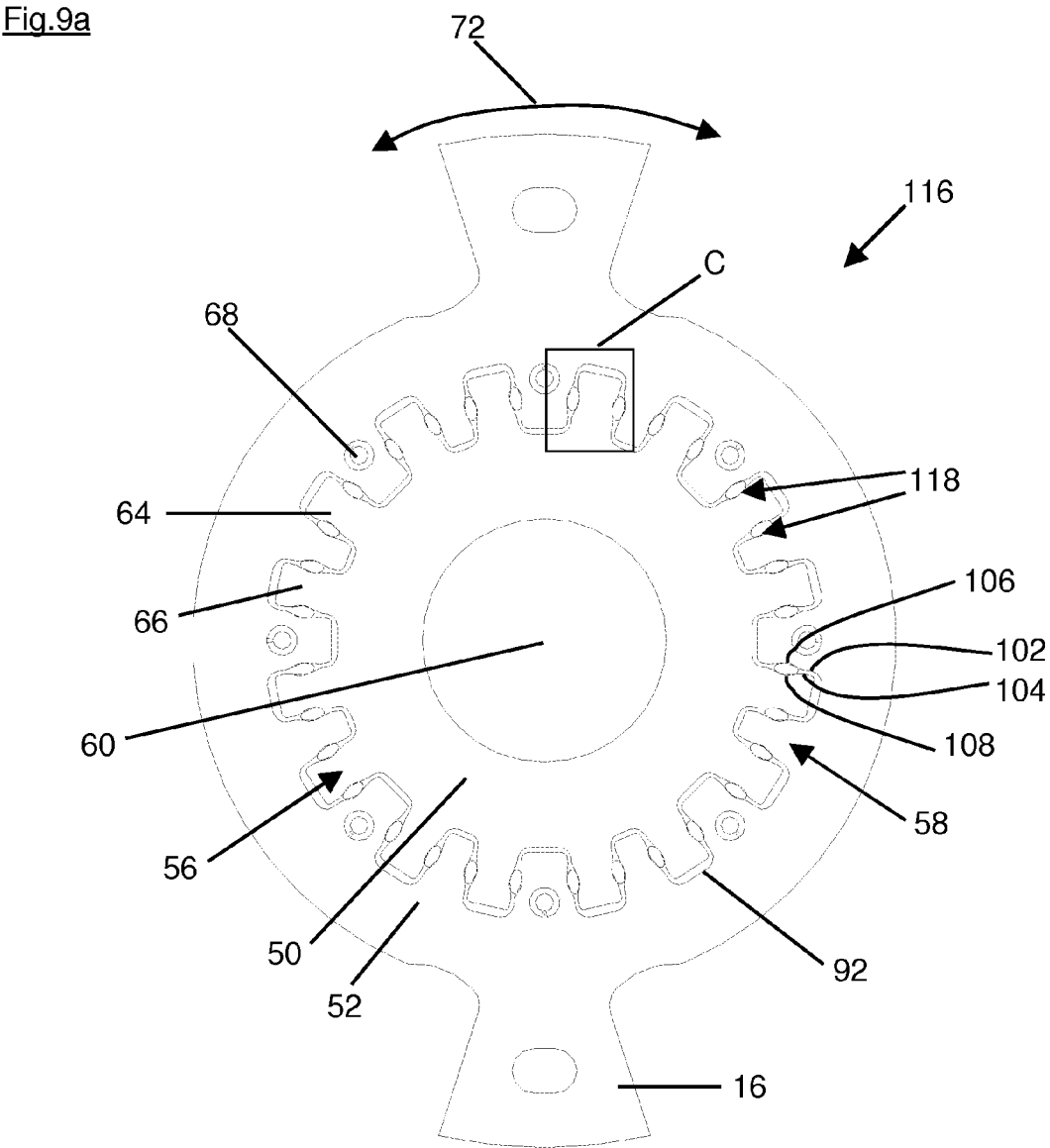
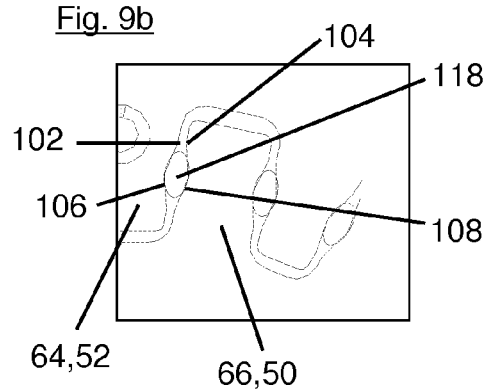
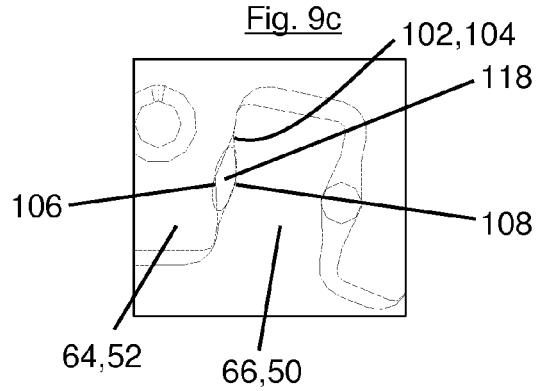

TORSIONAL VIBRATION DAMPER COMPRISING A SECTIONAL PRIMARY ELEMENT

CROSS-REFERENCE TO RELATED APPLICATION

This application claims benefit of PCT Patent Application PCT/EP2007/010544 entitled "TORSIONAL VIBRATION DAMPER COMPRISING A SECTIONAL PRIMARY ELEMENT" and filed on Dec. 5, 2007.

BACKGROUND OF THE INVENTION

1. Field of the Invention

The present invention relates to a torsional vibration damper with a drive-side primary element having at least one primary dog, with an output-side secondary element having at least one secondary dog and with at least one spring device between the primary dog and secondary dog for the spring-elastic coupling of the primary element and secondary element.

2. Description of the Related Art

A multiplicity of torsional vibration dampers or rotary vibration dampers are known in various fields of use from the prior art. The known torsional vibration dampers are used, in particular, in motor vehicle construction for the elastic coupling of the internal combustion engine and drive train. This is intended to prevent torsional vibrations from being transferred from the internal combustion engine to the drive train or to the transmission. Such a transfer of torsional vibrations occurs particularly in internal combustion engines having comparatively few cylinders and at low rotational speeds. With an effective damping of such vibrations, the internal combustion engine can be operated at lower rotational speeds, thus generally resulting in a reduced fuel consumption.

Thus, EP 1584838 A1 describes a torsional vibration damper with a drive-side primary element and with an output-side secondary element, the primary element being coupled spring-elastically to the secondary element via a spring device, so that these elements can be rotated with respect to one another about a "neutral" position. The primary and secondary elements comprise in each case dogs which are adjacent to the spring device and which are designated below as a primary and a secondary dog. A torque prevailing at the primary element on the drive side can thus be transferred by means of the primary dog first to the spring device and from the spring device to the secondary element via the secondary dog. The drive-side primary element is designed as a one-piece middle disk having primary dogs projecting radially outward.

DE 199 58 814 A1 describes a similar rotary vibration damper in the form of a two-mass flywheel. The known rotary vibration damper has a central disk element with a plurality of supporting arms arranged on the circumference, and a further disk element composed of two cover disk elements on which supporting projections are provided. Between the supporting arms and the supporting projections, spring devices are provided for the spring-elastic coupling of the central disk element and the further disk element. Here, too, the central disk element is produced in one piece.

The torsional or rotary vibration dampers known from the prior art have the disadvantage that high transfer noises may occur particularly during a traction/overrun change. This is attributable to the fact that, in a traction/overrun change, the primary dogs or supporting arms may lift off briefly from the spring device in order subsequently to impinge again on an end spring or an end saddle of the spring device. This may even be such that the vibration of the primary element or central disk element is transferred via its drive shaft to the engine, thus resulting in the generation of a particularly high noise.

An object of the present invention, therefore, is to provide a torsional vibration damper which can be operated with particularly low noise.

SUMMARY OF THE INVENTION

The present invention overcomes the disadvantages in the related art in a torsional vibration damper that includes a drive-side primary element having at least one primary dog, an output-side secondary element having at least one secondary dog, and at least one spring device between the primary and secondary dogs for spring-elastic coupling of the primary element to the secondary element and including a plurality of spring elements. A separator sheet includes a ring element. At least one sliding block extends from the ring element between adjacent ones of the spring elements and is arranged circumferentially about the spring elements. The primary element has also an inner part having an external toothing, an outer part on which the primary dog is arranged and having an internal toothing engaging into the external toothing, and at least one damping part arranged between the external and internal toothing for vibration damping between the inner and outer parts.

More specifically, the primary element can thus be connected, for example, to the engine output shaft and the secondary element to the transmission input shaft. The spring device may consist, for example, of a multiplicity of spring elements or spring sets arranged one behind the other in a circumferential direction.

Due to the damping element being arranged between the outer part and the inner part, excitations or jolts, which act on the primary dog on account of traction/overrun changes and lead to vibrations of the outer part, are effectively damped. A transfer of the vibrations to the inner part and therefore to the engine output shaft and the engine does not occur or occurs to only a slight extent. The generation of noise, particularly during traction/overrun changes, can thereby be reduced effectively.

In a preferred embodiment of the torsional vibration damper according to the invention, the secondary element also has an inner part and an outer part, on which the secondary dog is arranged. Here, too, at least one damping part for vibration damping is provided between the inner part and the outer part. As regards the advantages of this embodiment, reference may be made to the advantages described above, and in this case a transfer of the vibrations emanating from the secondary dogs via the secondary element to a transmission input shaft or the like can be reliably prevented or restricted.

In a further preferred embodiment of the torsional vibration damper according to the invention, the inner part is coupled rotationally elastically to the outer part via the damping part. Thus, in addition to the spring device, the damping part can contribute to eliminating the rotary jolts or torsional vibrations emanating from the engine, with the result that a particularly effective torsional vibration damper is afforded.

In a particularly preferred embodiment of the torsional vibration damper according to the invention, the at least one damping part is elastically deformable and consists preferably of an elastomer. The damping part may therefore be, for example, a rubber part which elastically absorbs the vibrations and rotary jolts.

In order in spite of the damping part to ensure a reliable transfer of the torque from the inner part to the outer part, in a further preferred embodiment of the torsional vibration damper according to the invention the inner part is provided with an external toothing and the outer part with an internal toothing. In this case, the external toothing engages into the internal toothing. Any form of toothing can be used in this case, as long as positive torque transfer is thereby ensured.

In an advantageous embodiment of the torsional vibration damper according to the invention, the at least one damping part is arranged between the internal and the external toothing. A particularly space-saving damping part is thus afforded which does not influence or scarcely influences the axial overall length of the primary element or secondary element and therefore of the torsional vibration damper.

In a further advantageous embodiment of the torsional vibration damper according to the invention, the damping part is arranged continuously in the circumferential direction between the internal and the external toothing, in order to achieve a particularly stable damping element and therefore reliable vibration damping.

In order, however, to keep the use of material low and nevertheless to ensure reliable vibration damping, in a particularly advantageous embodiment of the torsional vibration damper according to the invention a plurality of damping parts spaced apart from one another are provided. With the separated damping parts being of appropriately stable design, approximately the same functional reliability can thereby be achieved as with an individual damping part which is continuous in the circumferential direction.

According to a further preferred embodiment of the torsional vibration damper according to the invention, the damping parts are designed as tubular sleeves, the longitudinal axes of which extend transversely with respect to the circumferential direction. Sleeves of this type can be produced particularly simply and, furthermore, can be mounted or inserted in a simple way. The sleeves may consist, for example, of an elastomer, of metal or the like.

In a further advantageous embodiment of the torsional vibration damper according to the invention, the longitudinal axes of the tubular sleeves extend parallel to the axis of rotation of the torsional vibration damper. Thus, the behavior and the properties of the tubular sleeves used which occur when they are in operation, that is to say, for example, their elasticity and strength, can be predicted more effectively.

So that particularly high elasticity can be imparted to the tubular sleeves in a predetermined region, in a further advantageous embodiment of the torsional vibration damper according to the invention the tubular sleeves have a longitudinal slot.

In a particularly preferred embodiment of the torsional vibration damper according to the invention, the tubular sleeves are provided on the end faces with stops, preferably crimpings, for fixing the inner and the outer part axially with respect to one another. With the stops having an appropriately stable design, no or only insignificant measures for the further fixing of the inner and the outer part in the axial direction with respect to one another are necessary. Furthermore, the stops could serve for prefixing during the assembly process.

In a further advantageous embodiment of the torsional vibration damper according to the invention, at least one, preferably two holding parts arranged laterally with respect to the internal and external toothing are provided for the axial fixing of the inner and the outer part with respect to one another. Holding parts of this type could serve, for example together with the abovementioned stops of the damping parts, for axial fixing.

In a further advantageous embodiment of the torsional vibration damper according to the invention, the lateral holding parts are designed in the form of an annular disk, preferably as holding plates of annular disk form.

In a particular preferred embodiment of the torsional vibration damper according to the invention, the lateral holding parts are fastened to the inner or the outer part or to the damping parts. In the last-mentioned instance, the lateral holding part could, for example, form the stop of each damping part.

In a further preferred embodiment of the torsional vibration damper according to the invention, the damping parts are provided, preferably exclusively, between the mutually assigned tooth flanks of the internal and external toothing. Since rotation is transferred primarily via the tooth flanks of the internal and external toothing, on the one hand, a particularly effective damping of rotary jolts and, on the other hand, reliable vibration damping can thereby be achieved.

In a further particularly preferred embodiment of the torsional vibration damping according to the invention, depressions, in which the damping part is partially seated, are provided in the tooth flanks. Thus, on the one hand, the damping part can be positioned reliably between the internal and external toothing. On the other hand, the damping part is not pinched when particularly high torque jolts are transferred, since the compressed damping part is protected within the depression against further compression.

In an advantageous embodiment of the torsional vibration damper according to the invention, the internal and the external toothing are designed in such a way that, from a "neutral" position in which the tooth flanks of the internal and the external toothing are not directly adjacent to one another, the outer part can be rotated in a circumferential direction in relation to the inner part, along with the elastic deformation of the damping parts, into a "stop" position in which at least one tooth flank of the internal toothing is directly adjacent to the tooth flank of the external toothing. This may be achieved, for example, by means of the abovementioned depressions which extend only over a portion of the tooth flank, while the rest of the tooth flank can lie adjacently to the opposite tooth flank when the compressed damping part is pressed completely into the depression.

According to a further advantageous embodiment of the torsional vibration damper according to the invention, in the "neutral" position the damping parts are arranged under prestress between the mutually assigned tooth flanks of the internal and the external toothing.

According to a further advantageous embodiment of the torsional vibration damper according to the invention, the outer part can be rotated through a predetermined deflection angle from the "neutral" position into the "stop" position, the predetermined deflection angle being smaller than a predetermined deflection angle between the primary element and the secondary element. This ensures that the torsional vibrations of high amplitude are damped primarily by the spring device of the torsional vibration damper.

Other objects, features, and advantages of the present invention will be readily appreciated as the same becomes better understood while reading the subsequent description taken in conjunction with the accompanying drawings.

BRIEF DESCRIPTION OF THE DRAWINGS

The invention is explained in more detail below by means of exemplary embodiments, with reference to the accompanying drawings in which:

FIG. 9a shows a front view of a fourth embodiment of the primary element from FIG. 1, FIG. 9b shows the detail "C" from FIG. 9a in an enlarged illustration with the outer part in the "neutral" position, FIG. 9c shows the detail "C" from FIG. 9a in an enlarged illustration with the outer part in the "stop" position.

DETAILED DESCRIPTION OF THE INVENTION

Figure 1:
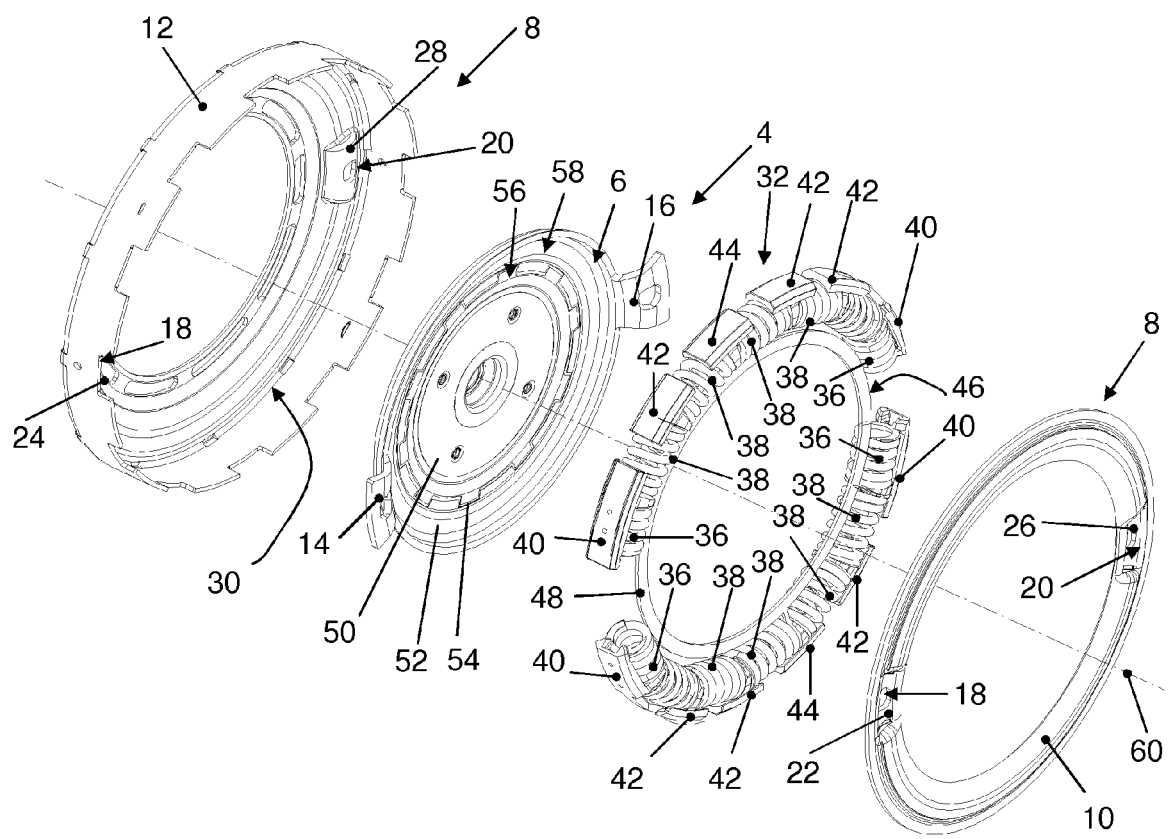
FIG. 1 shows a perspective exploded illustration of an embodiment of the torsional vibration damper according to the invention.
Figure 2:
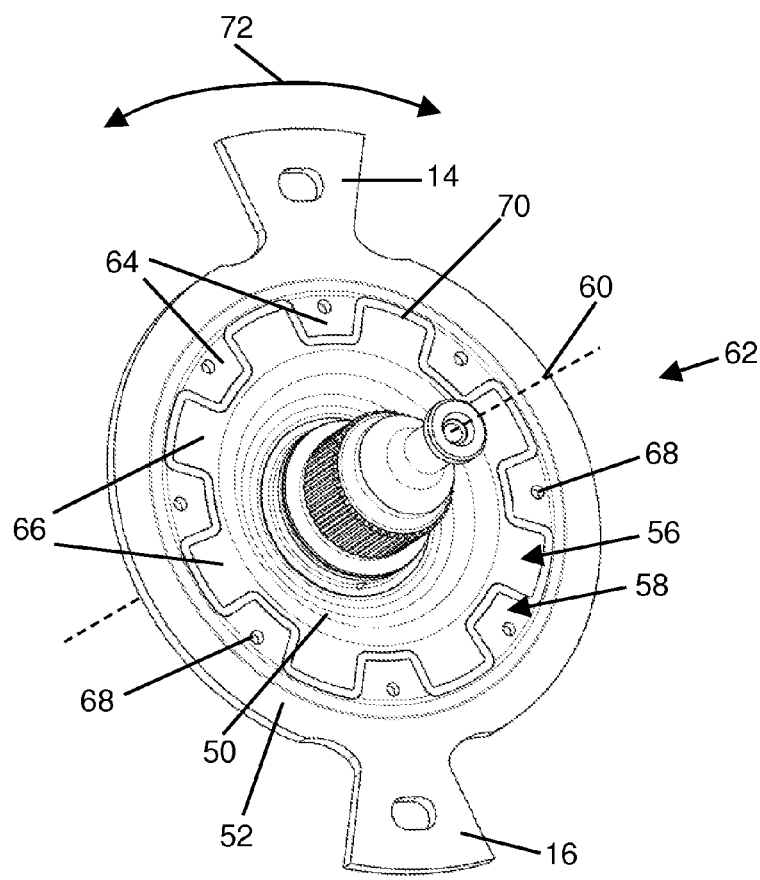
FIG. 2 shows a perspective illustration of a first embodiment of the primary element from FIG. 1 in a perspective front view.
Figure 3:
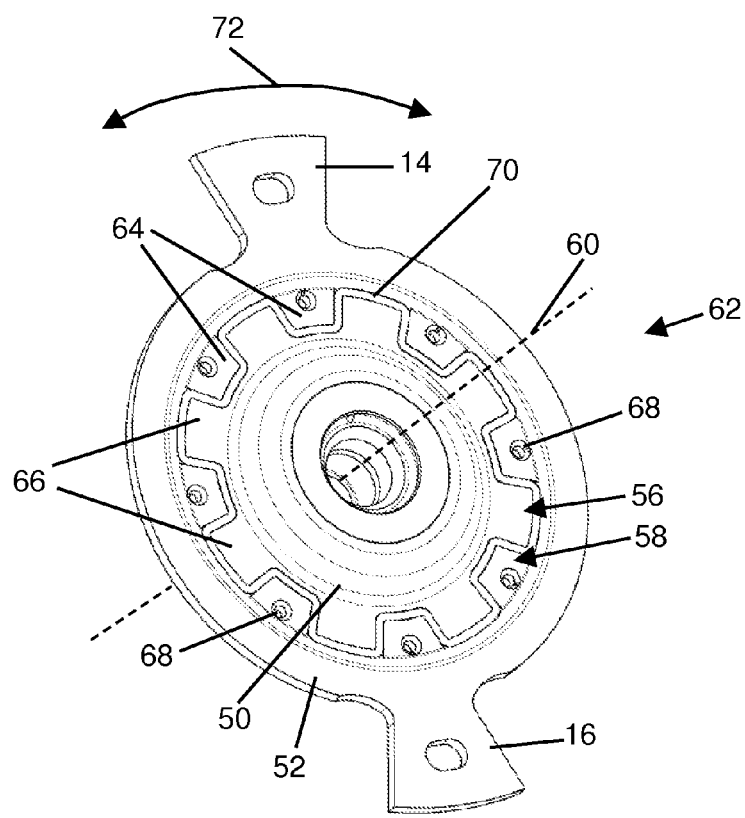
FIG. 3 shows the primary element from FIG. 2 in a perspective rear view.

FIG. 1 shows a perspective exploded illustration of an embodiment of the torsional vibration damper 2 according to the invention. The torsional vibration damper 2 has a drive-side or engine-side primary element 4 in the form of a middle disk 6 and an output-side or transmission-side secondary element 8, the latter being composed of a front side disk 10 and of a rear side disk 12 which are connected fixedly in terms of rotation to one another.

The primary element 4 in the form of the middle disk 6 has two dogs which are designated below as primary dogs 14, 16 and are arranged opposite one another on the outer circumference of the middle disk 6. On the two side disks 10, 12 of the secondary element 8, two dogs are likewise provided which are designated below as secondary dogs 18, 20. Like the secondary element 8 itself the secondary docs 18 and 20 are also composed of a front part 22 on the front side disk 10 and of a rear part 24 on the rear side disk 12 and respectively of a front part 26 on the front side disk 10 and of a rear part 28 on the rear side disk 12. The primary and secondary dogs 14, 16, 18, 20 are preferably produced in one piece with the primary and secondary elements 4, 8, respectively.

An annular space 30 is formed between the front side disk 10 and the rear side disk 12 in the assembled state. In the annular space 30 are provided two spring devices 32, 34 for the spring-elastic coupling of the primary element 4 and secondary element 8. The spring devices 32, 34 have a plurality of spring elements 36, 38 which are arranged one behind the other in the circumferential direction and which are preferably designed as helical springs. In this case, the end-side spring elements 36, which are directly adjacent on the end faces to the primary and secondary dogs 14, 16, 18, 20, are to be distinguished from the intermediate spring elements 38 which are not adjacent to any primary or secondary dog 14, 16, 18, 20.

Furthermore, the spring devices 32, 34 comprise sliding blocks 40, 42, 44 which are arranged on the end faces between the spring elements 32, 34. In this case, first, the end-side sliding blocks 40, which are adjacent to the end-side spring elements 36, are to be distinguished from the other sliding blocks 42, 44. Furthermore, the sliding blocks 42 are to be distinguished from the sliding blocks 44, since the latter are designed as part of a separator sheet 46. This separator sheet 46 comprises a ring element 48, on which the sliding blocks 44 are arranged circumferentially, one sliding block 44 extending between the spring elements 38 of one spring device 32, and the other sliding block 44 extending between the spring elements 38 of the other spring device 34.

The primary element 4 or the middle disc 6 is constructed in two parts, that is to say it comprises a radially interior inner part 50 and a radially exterior outer part 52. While the outer part 52 receives the primary dogs 14, 16 which, in the installation state, are adjacent to the free ends of the end-side spring elements 36, the inner part 50 is connectable, for example, to an engine output shaft. A damping part 54 for vibration damping is provided between the inner part 50 and the outer part 52. The inner part 50 is coupled rotationally elastically to the outer part 52 via the damping part 54. For the further coupling of the inner and outer parts 50, 52, the inner part 50 has an external toothing 56 and the outer part 50 an internal toothing 58, the external toothing 56 engaging into the internal toothing 58.

A rotation of an engine output shaft (not illustrated) can be transferred spring-elastically to the transmission-side secondary element 8 via the inner part 52, the damping element 54, the outer part 52, the primary dogs 14, 16, the spring devices 32, 34 and the secondary dogs 18, 20 of the side disks 10, 12 connected fixedly in terms of rotation to one another, the axis of rotation of the torsional vibration damper 2 being given the reference symbol 60 in FIG. 1.

By the damping part 52 being arranged between the outer part 52 and the inner part 50, excitations or jolts, which act on the primary dogs 14, 16 by means of the end-side spring elements 36 on account of traction/overrun changes and lead to vibrations of the outer part 52, are effectively damped. A transfer of the vibrations to the inner part 50 and therefore to the engine output shaft and the engine does not occur. The generation of noise is reduced particularly effectively.

While FIG. 1 shows a primary element 4 merely indicated diagrammatically, further advantageous embodiments of primary elements are described below with reference to FIGS. 2 to 10c and can be used in the torsional vibration damper 2 of FIG. 1. The foregoing general description of the primary element 4 also applies to the other embodiments, the same reference symbols being used for identical or similar parts.

FIGS. 2 to 6 show a first embodiment of a primary element 62 for the torsional vibration damper 2 of FIG. 1. The internal toothing 58 comprises a plurality of teeth 64 which extend radially inward between teeth 66 of the external toothing 56. In the teeth 64 of the internal toothing 58, clearances 68 are provided which extend in the axial direction through the outer part 52. Between the internal toothing 58 and the external toothing 56 is provided a single coherent damping part 70. The damping part 70 is of essentially annular design and therefore extends continuously in the circumferential direction 77 between the internal and the external toothing 58, 56, as can be seen particularly in FIG. 6 which shows a front view of the primary element 62.

The damping part 70 is manufactured from an elastic material, an elastomer having been used in this embodiment. In the present embodiment, therefore, it may be, for example, a rubber which has been introduced into the gap between the internal toothing 58 and the external toothing 56, so that the inner part 50 is at no point directly adjacent to the outer part 52.

Figure 4:
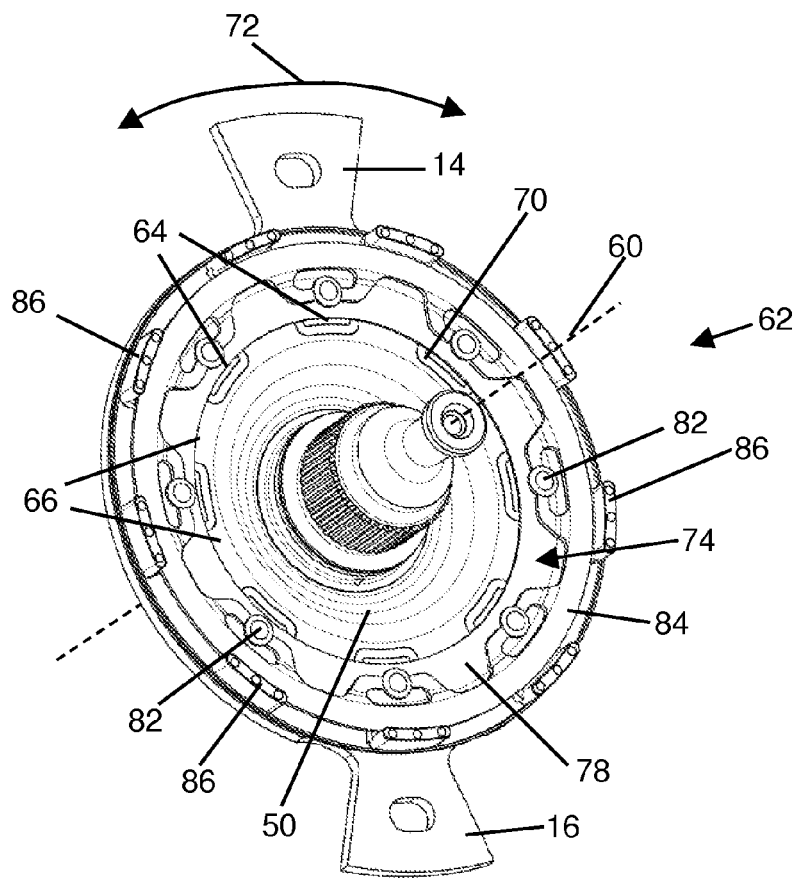
FIG. 4 shows the primary element from FIG. 2 with lateral holding parts in a perspective front view.
Figure 5:
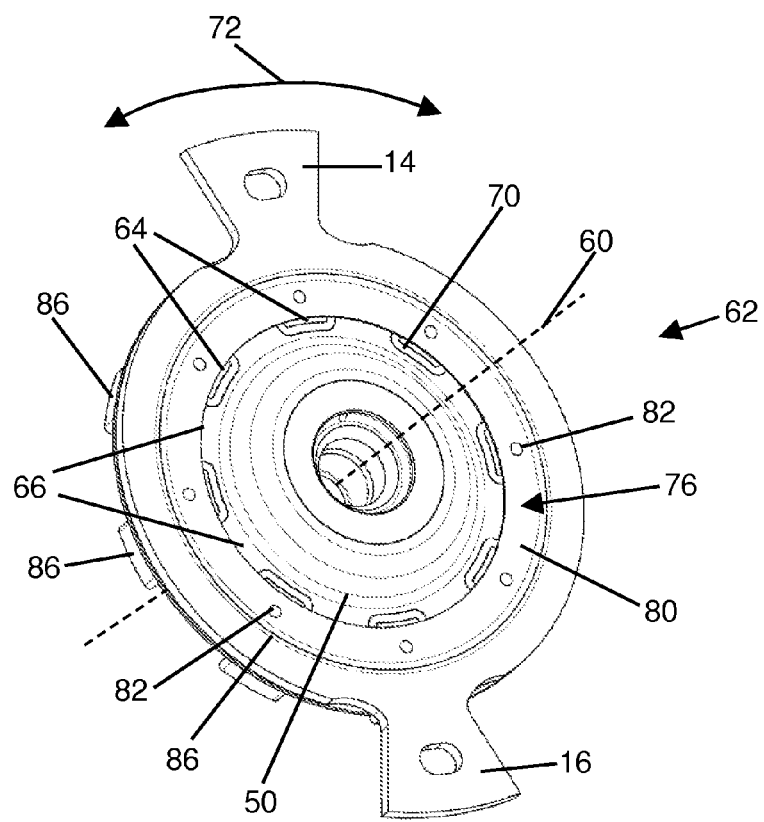
FIG. 5 shows the primary element from FIG. 4 in a perspective rear view.
Figure 6:
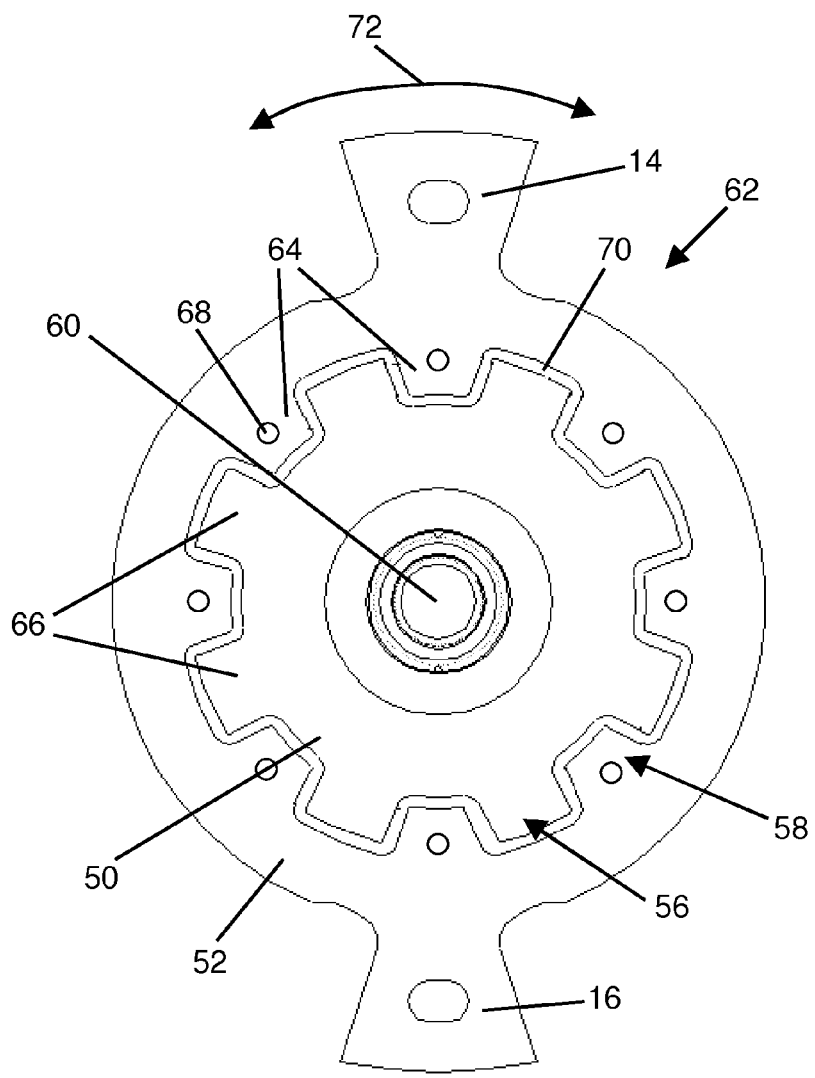
FIG. 6 shows the primary element from FIGS. 1 to 5 without lateral holding parts in a front view.

Furthermore, on the primary element 62, two lateral holding parts 74, 76 are provided, which are arranged on the front side of the primary element 62 (FIG. 4) and on the rear side of the primary element 62 (FIG. 5). The lateral holding parts 74, 76 are designed as holding plates 78, 80 of annular disk form and are arranged laterally level with the internal and external toothings 58, 56, so that the inner part 50 and the outer part 52 are fixed in their axial orientation with respect to one another. The inner part 50 is consequently prevented from slipping laterally out of the outer part 52 in the axial direction. The holding plates 78, 80 are in this case connected fixedly in terms of rotation to the outer part 52 via rivets 82 which extend through the clearances 68. Basically, however, the holding plates 78, 80 may also be connected to the inner part 50.

As is clear from FIG. 4, the holding plate 78 is used, furthermore, as a friction plate. Thus, furthermore, a guide plate 84 is fastened to the holding plate 78 via the rivets 82, there being guided between the holding plate 78 and the guide plate 84 friction blocks 86 which can be displaced in the circumferential direction 72 and are to bring about predetermined friction between the primary element 62 and the secondary element 8. The rivets 82 and the holding plate 78 thereby have a further function.

Figure 7A:
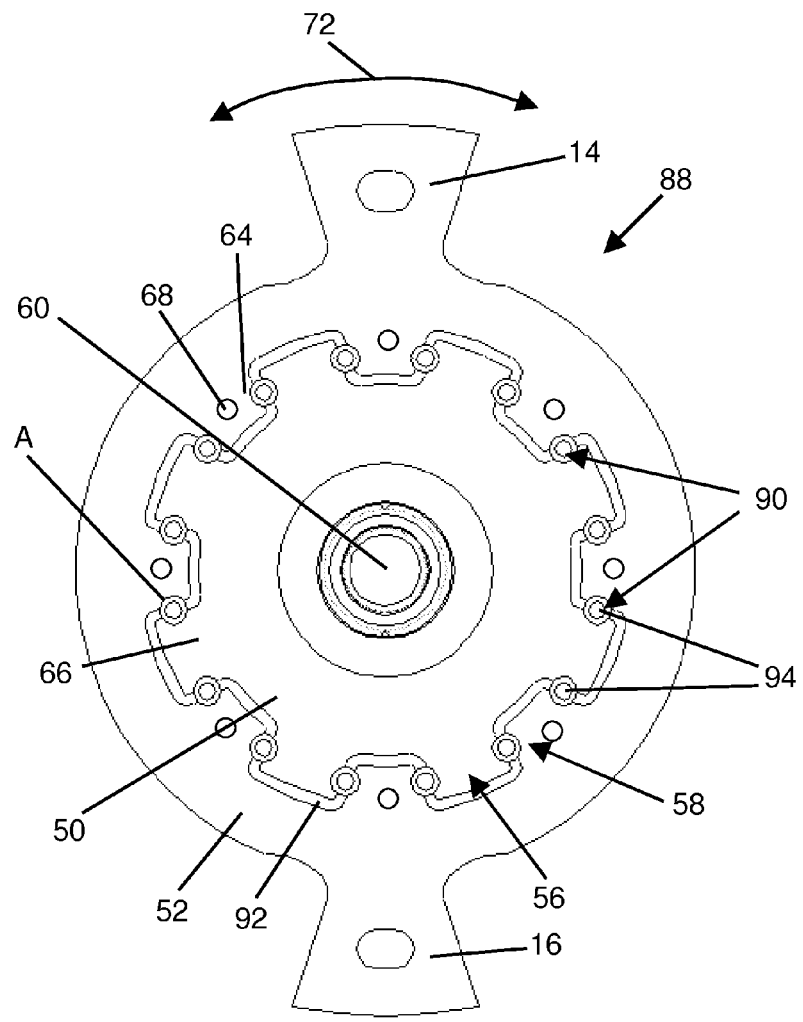
FIG. 7a shows a front view of a second embodiment of the primary element from FIG. 1.
Figure 7B:
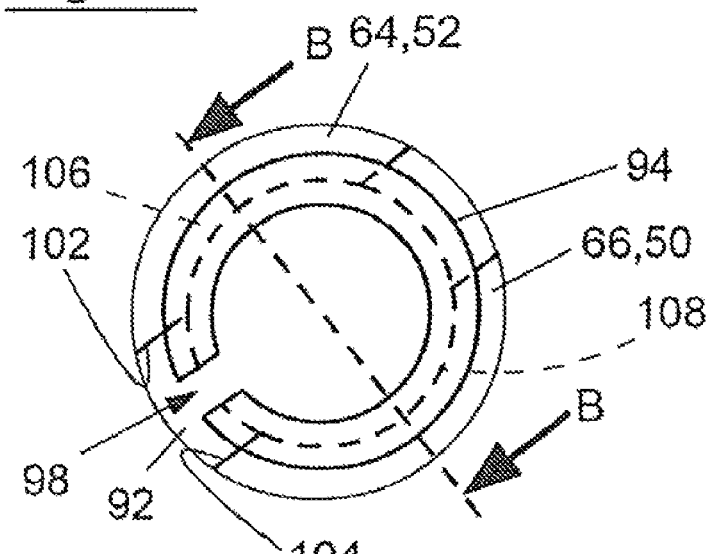
FIG. 7b shows the detail "A" from FIG. 7a in an enlarged illustration.
Figure 7C:
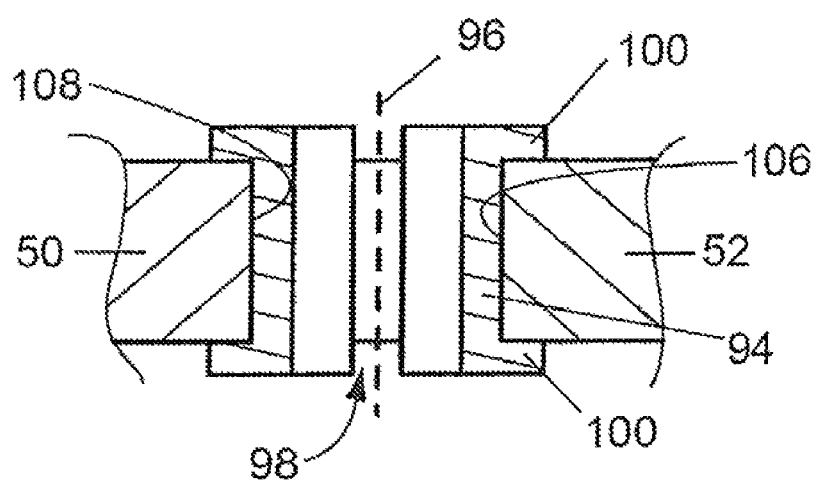
FIG. 7c shows a sectional view along the sectional line "B-B" of FIG. 7b.

FIGS. 7a to 7c show a second embodiment of a primary element 88 for the torsional vibration damper 2 of FIG. 1. Only the differences with respect to the first embodiment are explained below, the previous description applying correspondingly to the rest of the set-up, and the same reference symbols being used for identical or similar parts. In the second embodiment, a plurality of damping parts 90 are provided which are spaced apart from one another and which are arranged within the slot 92 between the internal and the external toothing 58, 56 of the outer and the inner part 52, 50. The damping parts 90 are in this case designed as tubular sleeves 94, the longitudinal axes 96 of which extend transversely with respect to the circumferential direction 72 and parallel to the axis of rotation 60 of the torsional vibration damper 2.

Furthermore, the tubular sleeves 94 have a longitudinal slot 98 which gives rise to a greater elasticity of each individual sleeve 94, the longitudinal slot 98 advantageously facing the slot 92 between the internal and the external toothing 58, 56, as may be gathered from FIG. 7b. The sleeves 94 are provided on the end faces with stops which are designed as crimpings 100. The crimpings 100 engage behind the front side and the rear side of the primary element 88 and consequently cause an axial fixing of the inner and the outer part 50, 52 with respect to one another, in a similar way to what is brought about by the abovementioned lateral holding parts 74, 76. In the embodiment shown in FIG. 7a, such lateral holding parts 74, 76 (FIGS. 4 and 5) could be used in addition to or in combination with the damping parts 90. Thus, for example, it is advantageous if the lateral holding parts 74, 76 were in each case fastened to the end faces of the damping parts 90 in order to form the stops of these.

The damping parts 90 are arranged exclusively between the mutually assigned or mutually opposite tooth flanks 102, 104 of the internal and the external toothing 58, 56. This is advantageous in as much as a torque is transferred from the inner part 50 to the outer part 52, and vice versa, primarily via the mutually assigned tooth flanks 102, 104. In the tooth flanks 102, 104, depressions 106, 108 lying opposite one another are provided, in which the damping part 90 is in each case partially seated.

Figure 8:
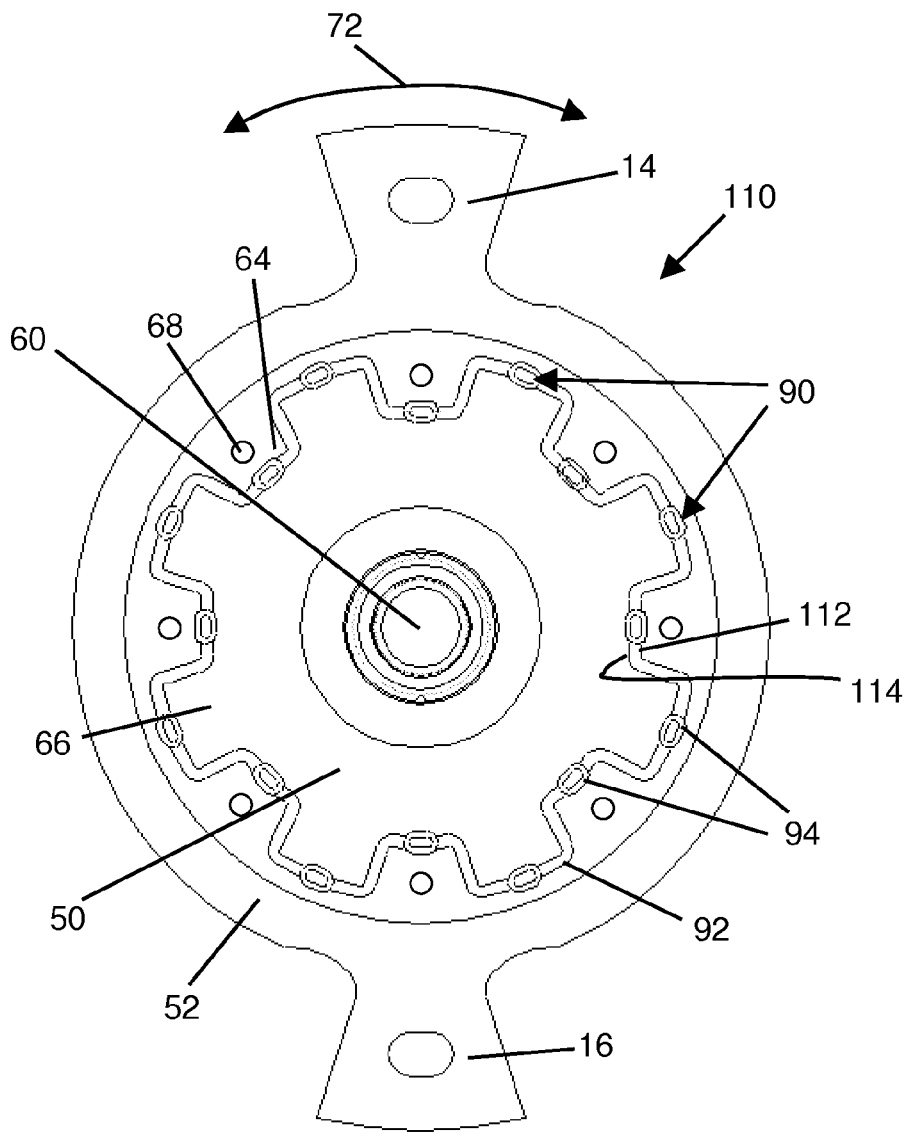
FIG. 8 shows a front view of a third embodiment of a primary element from FIG. 1.

As is clear from FIG. 8, which shows a third embodiment of a primary element 110 for the torsional vibration damper 2 of FIG. 1, the damping parts 90 may also be arranged between a tooth crest 112, on the one hand, and an opposite tooth space bottom 114, on the other hand, although the second embodiment is preferred because of the more direct arrangement of the damping parts 90 in the force flux.

FIGS. 9a to 9c show a fourth embodiment of a primary element 116 for the torsional vibration damper 2 of FIG. 1. Only the differences with respect to the second embodiment (FIG. 7a) are explained below, the previous description applying correspondingly to the rest of the set-up, and the same reference symbols being used for identical or similar parts. In contrast to the second embodiment, in the fourth embodiment damping parts 118 consisting of an elastomer are used again. FIG. 9a shows the outer part 52 in a "neutral" position, in which the tooth flanks 102, 104 facing one another are not directly adjacent to one another, as can be seen particularly in FIG. 9b. Instead, the damping part 118 is compressed elastically and is therefore seated under prestress in the depressions 106, 108 and separates the tooth flanks 102, 104 from one another.

The outer part 52 can then be rotated in the circumferential direction 72 in relation to the inner part 50 through a predetermined deflection angle until the outer part 52 comes into a "stop" position which is indicated in FIG. 9c. The predetermined deflection angle is in this case smaller than a predetermined deflection angle between the primary element 4 and the secondary element 8. This ensures that torsional vibrations of high amplitude are damped primarily by the spring devices 32, 34 of the torsional vibration damper 2. During rotation into the "stop" position, the damping parts 118 which lie in the direction of rotation are further compressed elastically until they are seated completely in the depressions 106, 108, and those regions of the tooth flanks 102, 104 facing one another which have no depression 106, 108 are directly adjacent to one another. This prevents a pinching or crushing of the damping part 118 from taking place under particularly pronounced torque jolts.

Figure 10A:
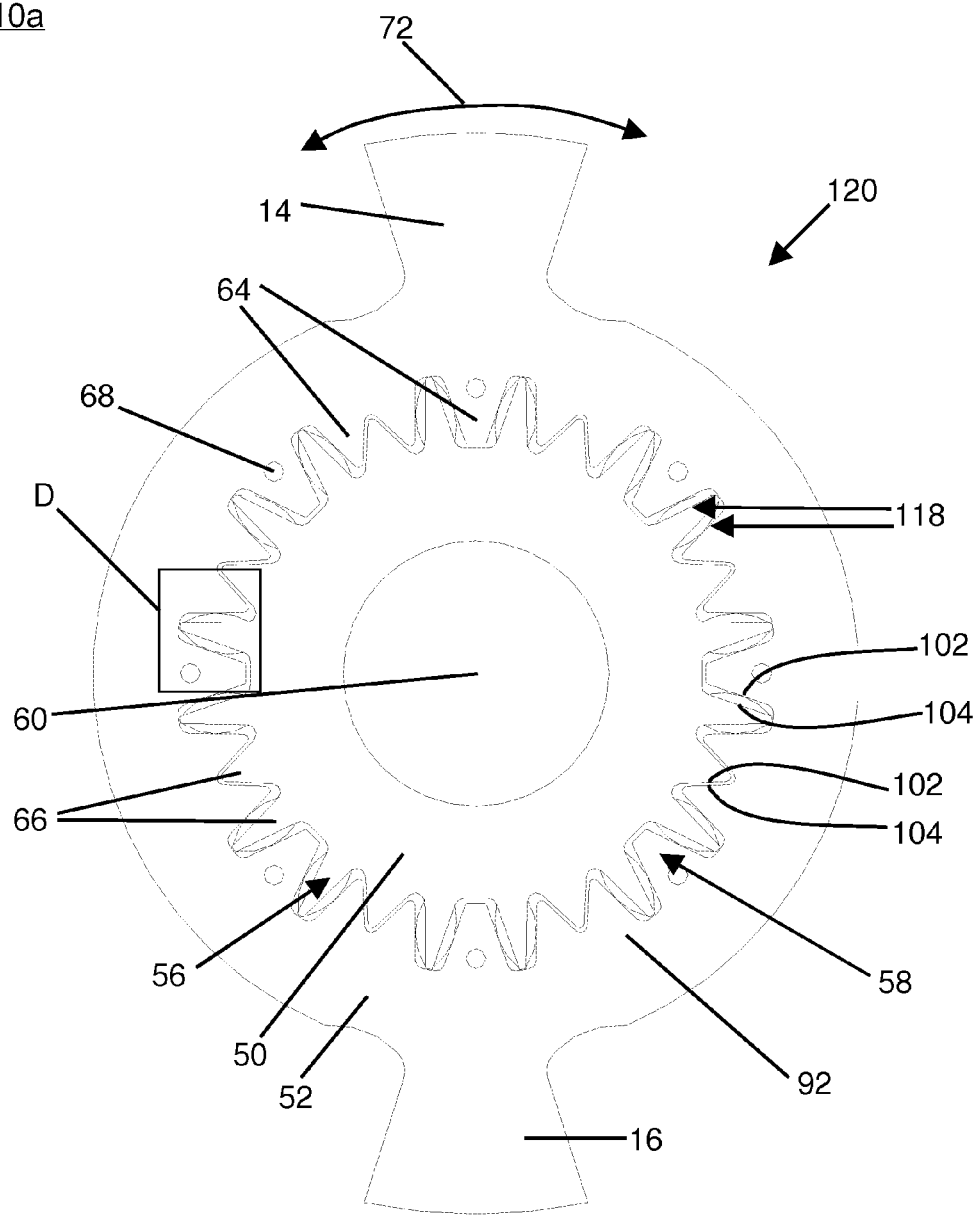
FIG. 10a shows a front view of a fifth embodiment of the primary element from FIG. 1.
Figure 10B:
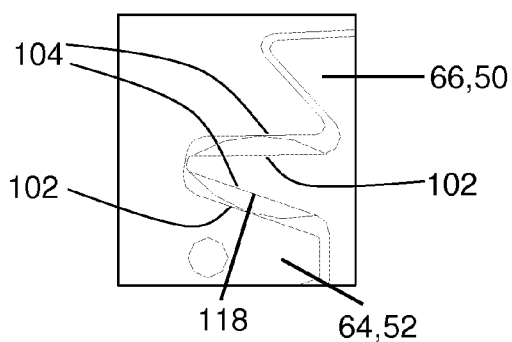
FIG. 10b shows the detail "D" from FIG. 10a in an enlarged illustration with the outer part in the "neutral" position.
Figure 10C:
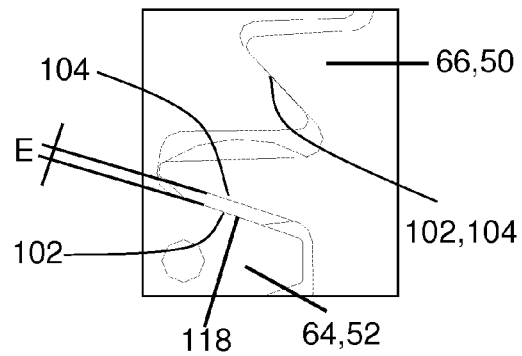
FIG. 10c shows the detail "D" from FIG. 10a in an enlarged illustration with the outer part in the "stop" position.

FIGS. 10a to 10c show a fifth embodiment of a primary element 120 for the torsional vibration damper 2 of FIG. 1. Only the differences with respect to the fourth embodiment (FIG. 9a) are explained below, the above description applying correspondingly to the remaining set-up, and the same reference symbols being used for identical or similar parts. In the fifth embodiment, damping parts 118 are not provided between all the tooth flanks 102, 104 assigned to one another. Also, the damping parts 118 do not have to be seated in depressions 106, 108 in the tooth flanks 102, 104. A pinching or crushing of the damping parts 118 under particularly pronounced rotary jolts is prevented in that the internal and external toothings 58, 56 are coordinated with one another in such a way that two mutually assigned tooth flanks 102, 104 are directly adjacent to one another in the "stop" position (FIG. 9c) of the outer part 52, while, between two other mutually assigned tooth flanks 102, 104 between which a damping part 118 is arranged, a distance E remains, which prevents a destruction of the damping part 118.

In the above-described embodiments, only a two-part primary element was described. According to the invention, however the secondary element 8, too, may have an inner part and an outer part, on which the secondary dog is arranged, in this case, too, at least one damping part for vibration damping being provided between the inner part and the outer part.

The damper 2 can be operated with particularly low noise and effectively reduces generation of noise, particularly during traction/over-run changes. Also, the spring devices 32, 34 primarily dampen torsional vibrations of high amplitude. And, the damper 2 effectively and reliably elastically dampens excitations or jolts, which act on the primary dogs 14, 16 on account of traction/over-run changes and lead to vibrations of the outer part 52. Furthermore, transfer of vibrations to the inner part 50 and, therefore, the output shaft of the engine of the vehicle and the engine does not occur or occurs to only a slight extent. In addition, transfer of vibrations emanating from the secondary dogs 18, 20 via the secondary element 8 to the input shaft of the transmission of the vehicle or the like can be reliably prevented or restricted. Moreover, the damper 2 can contribute to elastically eliminating rotary jolts or torsional vibrations emanating from the engine, elastically absorbs the vibrations and rotary jolts, ensures reliable positive torque transfer, keeps use of material low while being appropriately stable, can be produced and mounted or inserted particularly simply, and can impart particularly high elasticity. Plus, the damper 2 saves space, and overall axial length of the damper 2 is not influenced or is only scarcely influenced. Behavior and properties of the damper 2 can be predicted more effectively as well.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

The invention claimed is:
1. A torsional vibration damper comprising:
   a drive-side primary element (4, 62, 88, 110, 116, 120) having at least one primary dog (14, 16);
   an output-side secondary element (8) having at least one secondary dog (18, 20);
   at least one spring device (32, 34) between the primary and secondary dogs (14, 16, 18, 20) for spring-elastic coupling of the primary element (4, 62, 88, 110, 116, 120) to the secondary element (8) and including a plurality of spring elements (36, 38);
   a separator sheet (46) including a ring element (48); and
   at least one sliding block (44) extending from the ring element between adjacent ones of the spring elements (36, 38) and arranged circumferentially about the spring elements (36, 38), wherein the primary element (4, 62, 88, 110, 116, 120) has an inner part (50) having an external toothing (56), an outer part (52) on which the primary dog (14, 16) is arranged and having an internal toothing (58) engaging into the external toothing (56), and at least one damping part (54, 70, 90, 118) arranged between the external and internal toothing (56, 58) for vibration damping between the inner and outer parts (50, 52).

2. The torsional vibration damper as set forth in claim 1, wherein the inner part (50) is coupled rotationally elastically to the outer part (52) via the at least one damping part (54, 70, 90, 118).

3. The torsional vibration damper as set forth in claim 1, wherein the at least one damping part (54, 70, 90, 118) is elastically deformable.

4. The torsional vibration damper as set forth in claim 1, wherein the at least one damping part (54, 70) is arranged continuously in a circumferential direction between the internal and the external toothings (58, 56).

* * * * *